(12) United States Patent
Fuente et al.

(10) Patent No.: US 7,680,129 B2
(45) Date of Patent: Mar. 16, 2010

(54) PREEMPTIVE RETRANSMISSION OF BUFFERED DATA IN A NETWORK

(75) Inventors: Carlos Francisco Fuente, Portsmouth (GB); William James Scales, Fareham (GB); William John Passingham, Botley (GB); Robert Michael Jones, Bromley (GB)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 11/191,432

(22) Filed: Jul. 27, 2005

(65) Prior Publication Data

US 2005/0265370 A1    Dec. 1, 2005

Related U.S. Application Data

(63) Continuation of application No. PCT/GB03/04645, filed on Oct. 28, 2003.

(30) Foreign Application Priority Data

Jan. 30, 2003    (GB) ................................. 0302117.7

(51) Int. Cl.
     *H04L 12/56*      (2006.01)
(52) U.S. Cl. ..................................... 370/395.52; 714/18
(58) Field of Classification Search ................. 370/412, 370/229, 230, 395.52; 714/18
See application file for complete search history.

(56) References Cited

U.S. PATENT DOCUMENTS 5,276,840 A * 1/1994 Yu ............................... 710/35

| | | | | |
|---|---|---|---|---|
| 5,859,959 A | | 1/1999 | Kimball et al. ........ 395/182.02 |
| 6,067,608 A | * | 5/2000 | Perry .......................... 711/203 |
| 6,570,853 B1 | * | 5/2003 | Johnson et al. ............. 370/236 |
| 2001/0005169 A1 | * | 6/2001 | Tsuzuki et al. ............... 340/5.5 |
| 2003/0074374 A1 | * | 4/2003 | Karibe et al. ............. 707/104.1 |
| 2005/0041581 A1 | * | 2/2005 | Kuusinen et al. ............ 370/230 |
| 2005/0226149 A1 | * | 10/2005 | Jacobson et al. ............ 370/229 |

FOREIGN PATENT DOCUMENTS

| EP | 1 089 504 A2 | 4/2001 |
|---|---|---|
| WO | WO 00/42746 | 7/2000 |
| WO | WO 01/77830 A1 | 10/2001 |

* cited by examiner

*Primary Examiner*—Dang T Ton
*Assistant Examiner*—Kevin Lee
(74) *Attorney, Agent, or Firm*—Harrington & Smith

(57) ABSTRACT

An apparatus for data transmission over a network includes a buffer and a timer mechanism for timing an optimum interval (less than the round-trip error response delay) for retransmission of data. A first accessor accesses data in the buffer for transmission and starts a first timeout clock. Second or further accessors of the buffer are responsive to a timeout to access the data, start a timeout clock and attempt to transmit the data on a path avoiding path elements used by prior accessors. A counter increments and decrements a count of the references to the buffer by accessors and signals when the count reaches zero. A memory manager returns the buffer to a free buffer pool responsive to the reference counter signaling that the count has reached zero. An analysis mechanism can be used to determine the optimum interval and tune the timer mechanism.

17 Claims, 4 Drawing Sheets

PREEMPTIVE RETRANSMISSION OF BUFFERED DATA IN A NETWORK

CROSS REFERENCE TO RELATED APPLICATION

This application is a continuation of International Patent Application No. PCT/GB03/004645 filed Oct. 28, 2003, which claims priority to British Patent Application No. 0302117.7 filed Jan. 30, 2003.

FIELD OF THE INVENTION

The present invention relates to the field of distributed, networked, fault tolerant systems, and more particularly to those systems in which the speed and reliability of data transmission are important.

BACKGROUND OF THE INVENTION

Distributed systems are becoming an increasingly popular means of providing platforms for a variety of functions, including storage controller type functions. Their popularity arises from the flexibility and scalability such systems offer. Fault tolerance is implemented in a number of mutually supporting ways, such as providing redundant network infrastructures, or redundant storage attachments. Distributed applications depend on network connectivity and communications capability to perform their function. These fault tolerance features improve the availability of the system. High availability is also increasingly important for many applications.

Many systems implement retry algorithms for their network interfaces which operate as follows:
1. An error happens, such as a packet being dropped.
2. A timeout interval expires.
3. The network hardware or protocol stack detects the error.
4. The error is reported to the issuer of request.
5. The issuer attempts the request a second time, possibly using alternative hardware.

Such schemes are simple, and are adequate when it is acceptable to wait for the original request to fail. However, for some important environments, bare availability (lack of actual failures while attempting to access a service) is insufficient. In these environments, it is important to receive a response within a certain time. Failure to respond within that time will have a penalty comparable to that of a full-scale failure in accessing the service, for example, another application might time out and return an error condition, or an Internet user might click away to a competitor's web-site in frustration.

Thus, it would be advantageous to provide a method which would enable retries within a desired time limit, but existing systems do not naturally enable this. There are a number of problems to be addressed. First, the system might try to detect an error in a more timely fashion. It might be possible to reduce timeout intervals in interface adapters or hardware, but often there are architectural limits in how low these intervals can be. For example, in Fiber Channel, an exchange that fails to complete normally cannot be reused until the expiry of an error timeout interval defined by the switch, often 10 seconds. Further, many network implementations do not behave robustly if the network error timeout interval is reduced too much.

It might be possible to use some other timeout mechanism—one not associated with the interface software or hardware that has failed—to attempt to redrive the request, but this does not solve the problem, because the original request is still active. Any attempt to redrive the original request, using an alternative path offered by redundant hardware, will be blocked until the original request has completed, because there are resources associated with the original request that are still in use.

As a concrete example, where a Fiber Channel adapter is used to implement the transmission interface, and a multi-threaded user process is attempting to retransmit a buffer, a second transmission attempt will be blocked by the virtual memory system because the memory is still in use by the original transmission.

Another possible solution might be to attempt to avoid this memory blocking problem by retaining a copy of the transmission data in a private buffer. This copy could then be used to create a second transmission should the first be deemed to have taken too long. The private copy could be accessed without being blocked by the virtual memory manager, but this scheme would increase the cost of every transmission, including the majority which do not encounter a problem, because the data would have to be copied for each transmission before the first transmission attempt is made. Such an additional processing cost is likely to prove unacceptable in most modern networks.

SUMMARY OF THE INVENTION

The present invention accordingly provides, in a first aspect, an apparatus for data transmission over a network having multiple paths. The apparatus includes a buffer for containing a data item to be transmitted to a receiver; a timer mechanism for timing a predetermined optimum interval for retransmission of the data item to the receiver, where the interval is less than that required for receipt of any error signal from the network, the timer mechanism further signaling the end of the predetermined optimum interval; a first accessor of the buffer to access the data item for a first transmission and to start a first timeout clock set to the interval; and a second accessor of the buffer responsive to the signaling by the timer mechanism to access the data item for retransmission and to start a second timeout clock set to the interval. The second accessor attempts to select a path for transmission of the data item that avoids use of path elements used by the first accessor.

The present invention further provides in a second aspect thereof a computer program product that comprises a computer readable medium being a non-transitory signal including a computer readable program, where the computer readable program when executed on a computer causes the computer to access a data item in a buffer with a first accessor for a first transmission of the data item to a receiver through a network; start a first timeout clock set to time-out after an interval that is less than that required for receipt of any error signal from the network; responsive to a signal indicating that the first timeout clock has timed-out, to access the data item in the buffer with a second accessor for a second transmission of the data item to the receiver through the network, where the second accessor selects a path for the second transmission that avoids use, if possible, of network path elements used by the first accessor during the first transmission; and to start a second timeout clock set to time-out after the interval.

The present invention further provides in a third aspect thereof a method for data transmission over a network having multiple paths comprising accessing a data item in a buffer with a first accessor for a first transmission of the data item to a receiver through a network; starting a first timeout clock set to time-out after an interval that is less than that required for receipt of any error signal from the network; responsive to a signal indicating that the first timeout clock has timed-out, accessing the data item in the buffer with a second accessor for a second transmission of the data item to the receiver through the network, where the second accessor selects a path for the second transmission that avoids use, if possible, of network path elements used by the first accessor during the first transmission; and starting a second timeout clock set to time-out after the interval.

BRIEF DESCRIPTION OF THE DRAWINGS

A preferred embodiment of the present invention will now be described by way of example only, with reference to the accompanying drawings, in which.

DETAILED DESCRIPTION OF THE PREFERRED EMBODIMENTS

The presently most preferred embodiment of the present invention is implemented in a distributed storage controller, but it will be clear to one skilled in the art that the present invention can equally advantageously be implemented in other networked systems, including, but not limited to, networks of client and server computer systems. Such systems may be wired or wireless, and may comprise devices having local processing capabilities as well as devices lacking such capabilities, such as simple I/O devices.

In the preferred environment of a distributed storage controller, the memory management component maintains I/O Buffer descriptions for pieces of data up to 32 kB in size. The I/O Buffer contains data that was received from some external source, such as data from a host system received as part of a SCSI write operation. The I/O Buffer can be translated to a scatter-gather list of PCI addresses, and these can be used as part of the data transfer instructions to a Fiber Channel adapter.

The memory manager does not block a client to construct the scatter-gather list, or when a transmission is active. The buffer must remain "pinned" (that is, the virtual memory used for the buffer is forced to remain real) as long it has been used by any I/O hardware device and that I/O hardware device's transmission has not yet completed with either definite success or definite failure.

Figure 1:
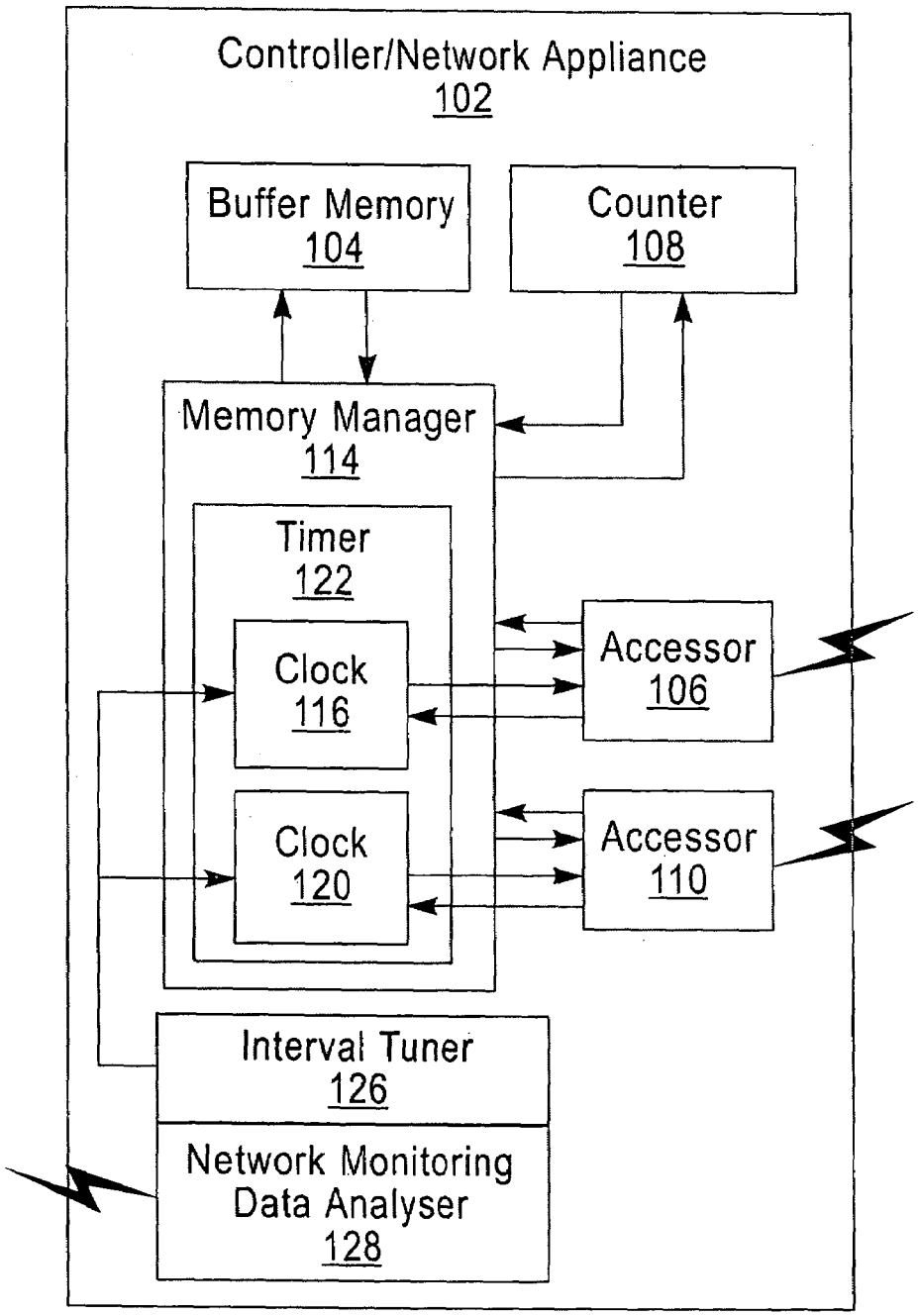
FIG. 1 is a block diagram representing an apparatus according to a preferred embodiment of the present invention.

FIG. 1 shows an apparatus (102) according to a preferred embodiment of the present invention, having a buffer memory (104) accessible by memory manager (114) responsive to access requests by accessors (106, 110). Memory manager (114) is in communication with counter (108). Counter (108) maintains a count of the number of references to the buffer memory (104) by the accessors (106, 110), the count being incremented on each reference and decremented on completion of each accessor's data transmission. The counter (108) is further adapted to signal when the count reaches zero. Accessors (106,110) are associated with respective timer clock instances (116, 120). The timer clock instances (116, 120) are provided within a timer mechanism (122), which is adapted for timing a predetermined optimum interval, which is less than the "round trip" time that would be required to return a real error condition from the network. The timer mechanism (122) is further adapted to signal the end of the predetermined optimum interval as set by each timer clock instance (116, 120).

Memory manager (114) is adapted to lock buffer memory during write activity, to permit read access to the buffer memory (104) by accessors (106, 110) and to return the buffer memory to a free buffer pool when counter (108) signals that the count has reached zero.

To track the multiple concurrent processes, the memory manager (114) thus maintains a reference count of concurrent accessors. Concurrent accessors of a memory buffer are allowed to read the data, but not write (change) the data. Consequently, multiple processes can be active concurrently reading the source of the data, provided none of the processes attempts to change the data. As each process completes, it 'frees' its reference to the buffer; the reference count is decremented. When the last process completes, the reference count reaches zero, and the buffer is put into the pool of free buffers.

Thus this memory manager (114) allows multiple processes to transmit the data from the buffer (104), since transmission does not involve changing the content of data.

The memory manager (114) allows a second or further process to start to transmit the same buffer of data, constructing its own PCI scatter-gather list to access the buffer, even though an original request, or even many prior requests, is still active.

In a preferred embodiment of the present invention, each alternative path is chosen so as to offer reasonable confidence that it is likely to be more successful than the first or other earlier paths. This is ensured by selecting the alternative paths from a completely separate set of hardware elements, for example, a separate interface adapter, or a different physical network. Paths may be further selected using additional criteria, such as available bandwidth, response times assessed from ping responses during periods when the controller or appliance was idle, and the like.

In a further preferred embodiment, an interval tuner (126) is used to tune the interval used by clocks (116, 120), based on analysis of data by a network monitoring data analyzer (128).

The memory manager (114) of the preferred embodiment, combined with a timer mechanism adapted to optimize performance by balancing the need for rapid retransmission in the case of a probable failed transmission against the need to avoid excessive retransmission overhead, thus allows timely retransmission of the data from a buffer. At the same time, the counter of the preferred embodiment allows the buffer memory to be allocated, "pinned", and freed without preventing read accesses by further accessors.

The mechanism of the preferred embodiment requires a protocol be implemented at the receiver of the transmission to enable it to cope with duplicate receptions of data, in case a timed-out transmission is delayed and not permanently lost. Such schemes are well understood in the art, and are already implemented in protocols such as TCP/IP, and so they will not be discussed further here.

Figure 2A:
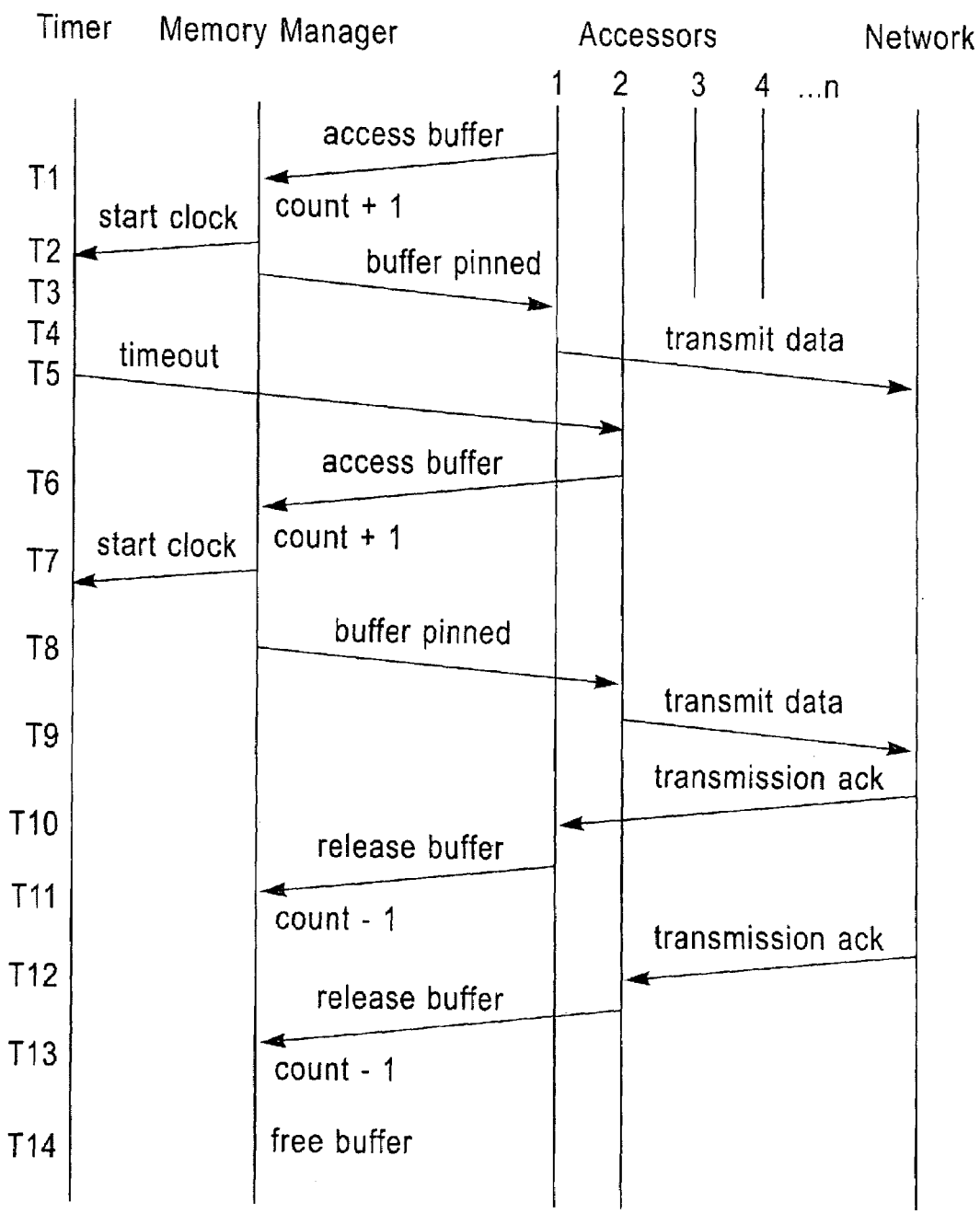
FIG. 2a represents an exemplary communications flow according to a preferred embodiment of the present invention.

Turning to FIG. 2a there is shown an example of a simple communications flow illustrative of the method according to a preferred embodiment of the present invention.

The communications flow involves a timer, a memory manager, accessors 1 and 2 (further accessors 3,4 . . . n are also shown to indicate that a plurality of such accessors may exist), and a network. The flows will be defined in terms of a set of times T1, T2 and so on. The communications flow illustrates an exemplary case in which a first accessor times out and a second accessor is permitted to access the same buffer (104)

in order to retransmit the data. Both the flows complete (either with successful receipt of the data or with a definite error return).

At T1, a first accessor accesses a buffer, and the counter (108) is incremented to record its access. At T2, the clock is started to count down for the predetermined optimum timeout interval. The buffer (104) is pinned at T3, and at T4 accessor 1 transmits the data over the network. At T5, accessor 1's timeout interval expires, and accessor 2 is triggered to access the buffer (104). This occurs at T6, and the counter (108) is incremented to record the access. At T7, the clock is started to count down to timeout for accessor 2. At T8, the buffer (104) is pinned, and at T9, accessor 2 transmits the data. At T10, accessor 1's transmission is acknowledged by the network and accessor 1 releases its access to the buffer (104). The counter (108) is decremented to record the end of accessor 1's access. At T12, accessor 2's transmission is acknowledged by the network. At T13 accessor 1 releases its access to the buffer (104) and the counter (108) is decremented. At T14, the count being zero, the buffer (104) is returned to the free buffer pool. It will be clear to one skilled in the art that this is a much simplified example created solely to set forth the basic set of flows that can occur within the preferred embodiment.

Figure 2B:
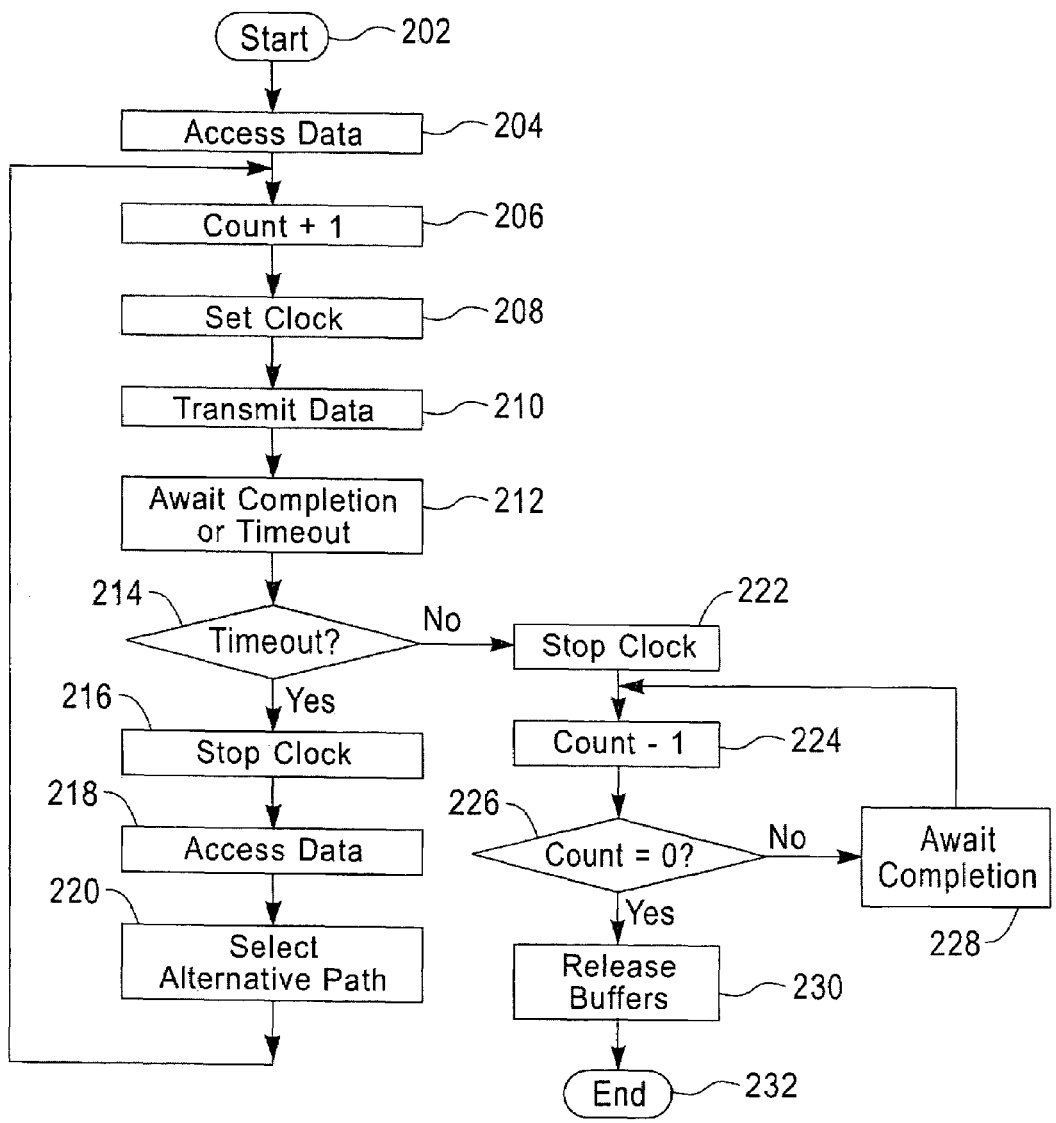
FIG. 2b shows a logic flow according to a preferred embodiment of the present invention.

The logic flow of FIG. 2b shows a method for transmission of data according to a preferred embodiment where there is provided a buffer memory (104), a memory manager (114) adapted to lock buffer memory (104) during write activity, to permit read access to the buffer memory (104) and to return the buffer memory (104) to a pool of free buffer memory, and a timer mechanism for timing a predetermined optimum interval for retransmission of said data, said interval being less than that required for receipt of any error signal from said network, and for signaling the end of said predetermined optimum interval.

At step (202), the runtime logic process according to the presently preferred embodiment is entered. At step (204), a first accessor accesses data in a buffer memory for transmission. At step (206), the count is incremented to record the accessing of the buffer memory (104) by the first accessor, and at step (208) the timeout clock is set to the predetermined optimum interval for retransmission of the data, that interval being less than the round-trip time that would be required for receipt of any error signal from the network.

At step (212), the system waits for either notification from the network that a transmission has reached completion (whether a successful receipt of the transmission or a definite failure signal from the network) or the expiry of the timeout interval. At step 214, a test for timeout is performed, and if there has been no completion received before expiry of the timeout interval, the logic initiates step (216), in which the clock is stopped. At step (218) a second or further accessor accesses the same data in the same buffer memory for retransmission over the network. At step (220) the second or further accessor selects an alternative path for transmission of the data, the step of selecting being adapted to select a complete set of different path elements if possible, and if that is not possible, to select as many alternative path elements as possible. Each non-first accessor attempts to avoid use of path elements used by any prior accessor.

The alternative path might be selected further by means of an optimizing logic element to select, for example, the least transmission cost path or the highest performance path, or perhaps the path offering the best quality-of-service guarantees. Such quality-of-service guarantees are well known in the network communications art and need not be described here. In a presently preferred embodiment, the alternative path is selected on the basis of an analysis of network performance monitoring statistics.

The logic flow proceeds to step (206) where the count is incremented to record the step of accessing the buffer memory (104) by the second or further accessor and continues as before to set the clock, etc.

Figure 3:
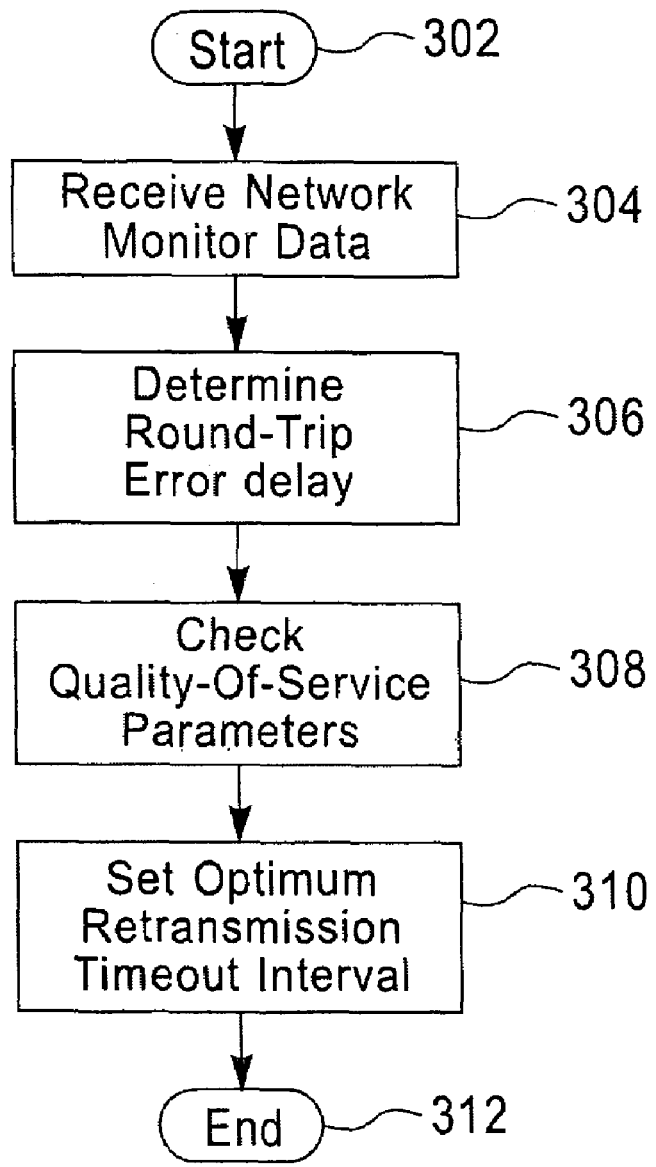
FIG. 3 represents the logic flow of a further preferred refinement of one embodiment of the present invention.

On any iteration at step (214) if there is a positive response to the test indicating that there has been a completion (whether a successful receipt of the transmission or a definite failure signal from the network) before expiry of its respective transmission's timeout, the clock is stopped at step (222) and the count is decremented at step (224). At step (226), a further test is performed to determine whether the count has reached zero or not. If it has not reached zero, this part of the logic process returns to step (228) to be triggered by the next completion. If on any iteration, the count is determined to have reached zero, the memory manager (114) releases the buffer memory (104). Turning now to FIG. 3, there is shown a further preferred refinement of the exemplary embodiment. The logic process of FIG. 3 starts at step (302) and at step (304) receives network monitoring data. Such data may be provided by any of numerous network monitoring devices, systems or computer programs well known in the art. From this, an assessment is made at step (306) of the round-trip response time that can be expected, and at step (308) any quality-of-service parameters that have been set are examined. Based on these inputs, at step (310) the optimum retransmission timeout interval is set. At step (312) this part of the process ends. As will be clear to one skilled in the art, this process may be iterative, and may be performed at intervals to reset the optimum interval according to the most recent data received from the network and from any setter of quality-of-service parameters.

In view of the foregoing it should be apparent that the present invention accordingly provides, in a first aspect, an apparatus for data transmission over a network having multiple paths comprising a buffer for containing a data item to be transmitted to a receiver; a timer mechanism for timing a predetermined optimum interval for retransmission of said data item to said receiver, said interval being less than that required for receipt of any error signal from said network, said timer mechanism further signaling the end of said predetermined optimum interval; a first accessor of the buffer to access data for a first transmission and to start a first timeout clock set to said interval in said timer mechanism; and a second accessor of the buffer responsive to said signaling by said timer mechanism to access said data for retransmission and to start at least a second timeout clock set to said interval in said timer mechanism, said second accessor attempting to select a path for transmission of said data avoiding use of path elements used by said first accessor.

The apparatus preferably further comprises a reference counter for maintaining a count of the references to said buffer by said first accessor and said second accessor, said reference counter being incremented on each of said references and decremented on completion of each data transmission by said first accessor and said second accessor, said reference counter signaling when said count reaches zero; and a memory manager adapted to permit read access to said buffer by said first accessor and said second accessor and to return said buffer to a free buffer pool responsive to said reference counter signaling when said count reaches zero.

The apparatus preferably further comprises an analysis mechanism for determining said optimum interval for retransmission of said data; and a tuning mechanism for tuning said timing mechanism to said optimum interval for retransmission of said data.

Preferably, said analysis mechanism is operable to use network monitoring data to determine the optimum interval for retransmission of said data.

Preferably, the network comprises a storage network.

Preferably, the network comprises the Internet.

In a second aspect, the present invention provides a storage controller including an apparatus for data transmission over a network having multiple paths comprising a buffer for containing a data item to be transmitted to a receiver; a timer mechanism for timing a predetermined optimum interval for retransmission of said data item to said receiver, said interval being less than that required for receipt of any error signal from said network, said timer mechanism further signaling the end of said predetermined optimum interval; a first accessor of buffer to access data for a first transmission and to start a first timeout clock set to said interval in said timer mechanism; and a second accessor of said buffer responsive to said signaling by said timer mechanism to access said data for retransmission and to start at least a second timeout clock set to said interval in said timer mechanism, said second accessor attempting to select a path for transmission of said data avoiding use of path elements used by said first accessor.

In a third aspect, the present invention provides a network appliance including an apparatus for data transmission over a network having multiple paths comprising a buffer for containing a data item to be transmitted to a receiver; a timer mechanism for timing a predetermined optimum interval for retransmission of said data item to said receiver, said interval being less than that required for receipt of any error signal from said network, said timer mechanism further signaling the end of said predetermined optimum interval; a first accessor of buffer to access data for a first transmission and to start a first timeout clock set to said interval in said timer mechanism; and a second accessor of said buffer responsive to said signaling by said timer mechanism to access said data for retransmission and to start at least a second timeout clock set to said interval in said timer mechanism, said second accessor attempting to select a path for transmission of said data avoiding use of path elements used by said first accessor.

Preferred features of the storage controller of the second aspect and the network appliance of the third aspect correspond to the respective preferred features of the apparatus of the first aspect.

In a fourth aspect, the present invention provides a method for data transmission over a network having multiple paths comprising the steps of providing a buffer for containing a data item to be transmitted to a receiver; providing a timer mechanism for timing a predetermined optimum interval for retransmission of said data item to said receiver, said interval being less than that required for receipt of any error signal from said network, said timer mechanism further signaling the end of said predetermined optimum interval; accessing data in a buffer by a first accessor for a first transmission; starting a first timeout clock set to said interval in said timer mechanism; accessing data in a buffer by a second accessor responsive to said signaling by said timer mechanism; retransmitting said data by said second accessor; starting a second timeout clock set to said interval in said timer mechanism; and attempting by said second accessor to select a path for transmission of said data avoiding use of path elements used by said first accessor.

The method preferably further comprises the steps of maintaining by a reference counter a count of the references to said buffer by said first accessor and second accessor, said reference counter being incremented on each of said references and decremented on completion of each data transmission by said first accessor and said second accessor, said reference counter signaling when said count reaches zero; and permitting by a memory manager read access to said buffer by said first accessor and said second accessor and returning said buffer to a free buffer pool responsive to said reference counter signaling when said count reaches zero.

The method preferably further comprises the steps of determining said optimum interval for retransmission of said data; and tuning said timing mechanism to said optimum interval for retransmission of said data.

Preferably, said step of determining uses network monitoring data to determine said optimum interval for retransmission of said data.

Preferably, said network comprises a storage network.

Preferably, said network comprises the Internet.

In a fifth aspect, the present invention provides a computer program comprising computer program code to, when loaded into a computer system and executed, perform the steps of the method of the fourth aspect.

The system is thus preferably structured so that multiple transmissions of data from the same application buffers can be outstanding simultaneously.

Some resources, such as hardware control blocks, are always consumed for the duration of a hung transmission. The system is thus preferably structured so that such resources are segregated into independent transmission paths. In consequence, a hung transmission on one path will not impede the ability to transmit data down a second path.

While a transmission is active (and not acknowledged), a timer is preferably operational to provide early detection of any unusual delay in receiving a response. When the timer threshold is reached, this indicates that there may be an advantage in trying an alternative path. The transmission is thus suitably reissued immediately down the alternative path, without having to wait or block for the first transmission to complete.

It will be clear to one skilled in the art that the interval set for the timer should be selected to optimize performance, by striking a balance, suited to the particular network and its attached devices, between failing to respond quickly enough to a possible transmission failure and, on the other hand, burdening the system with additional retransmissions based on "false positives", when the system responds too frequently and the retransmission overhead is increased too much. In a preferred embodiment of the present invention the interval used may be tuned to set it to the optimum value. In a most preferred embodiment, the timer interval is set based on monitoring of the network so as to ensure that the interval is tuned to the optimum value based on the network performance. In a further or alternative embodiment, quality-of-service requirements maybe taken into account in determining the optimum interval.

The preferred embodiment of the present invention further alleviates the problem caused by the fact that conventional virtual memory systems of the prior art do not support multiple concurrent transmissions from application buffers because they are unable to track the progress of the multiple transmissions or police application access to the transmission buffers. In conventional systems of the prior art, once a buffer has been assigned to contain a particular data item, and has had its real address given to a hardware I/O device, it is in effect "frozen" and cannot be accessed by any entity other than the hardware I/O device, even including the operating system, which cannot, for example, be permitted to swap the page containing the buffer out to disk, as the hardware I/O device must be able to rely on the memory reference it has been given for the duration of the transmission. The preferred embodiment of the present invention alleviates this limitation by providing a mechanism for controlling the multiple accesses outside the scope of the hardware I/O device and operating system to permit timely retransmission to improve system performance in spite of network path disruptions.

The preferred embodiment of the invention has the further advantage that it does not require extra copying of the data. In cases in which an alternative path is working, the timely availability of data in the system may be maintained in spite of a disruption or other delay on one of the transmission paths.

What is claimed is:

1. An apparatus for data transmission comprising:
a buffer storing a data item to be transmitted to a receiver, wherein the buffer is configured to be pinned when in use by a hardware device and the buffer is configured to be pinned until a transmission from the hardware device is completed with one of a definite success and a definite failure, wherein when the buffer is pinned virtual memory used for the buffer is forced to remain real;
a plurality of hardware resources segregated into a plurality of independent transmission paths;
a timer mechanism for timing a predetermined optimum interval for a retransmission of the data item to the receiver, the predetermined optimum interval being less than a round-trip time required for receipt of an error condition from the network, the timer mechanism further signaling an end of the predetermined optimum interval;
a memory manager configured to maintain a reference count of concurrent accessors;
a first accessor of the buffer to access the data item for a first transmission and to start a first timeout clock set to the predetermined optimum interval;
a second accessor of the buffer responsive to the signaling of the end of the predetermined optimum interval by the timer mechanism to access the data item for the retransmission and to start a second timeout clock set to the predetermined optimum interval, the second accessor attempting to select a path for transmission of the data item avoiding use of path elements used by the first accessor, wherein the memory manager is further configured to lock the buffer during write activity, to permit read access to the buffer by the first accessor and the second accessor and to return the buffer to a free buffer pool when the reference count reaches zero;
a network monitoring data analyzer configured to analyze data for the apparatus; and
an interval tuner configured to tune the predetermined optimum interval timed by the timer mechanism.

2. The apparatus as claimed in claim 1, further comprising:
a reference counter of the memory manager for maintaining a count of the references to the buffer by the first accessor and the second accessor, the reference counter being incremented on each of the references and decremented on completion of each data transmission by the first accessor and the second accessor, the reference counter signaling when the count reaches zero.

3. The apparatus as claimed in claim 1, in which the data analyzer is configured to determine the predetermined optimum interval for the retransmission of the data.

4. The apparatus as claimed in claim 3, in which the data analyzer is configured to use network monitoring data to determine the predetermined optimum interval for the retransmission of the data.

5. The apparatus as claimed in claim 1, where the apparatus comprises a storage controller.

6. The apparatus as claimed in claim 1, where the network comprises a storage network.

7. The apparatus as claimed in claim 1, where the network comprises the Internet.

8. A computer program product comprising a computer readable medium being a non-transitory signal storing a computer program, where the computer program when executed on a computer causes the computer to:
store in a buffer a data item to be transmitted to a receiver, pin the buffer when in use by a hardware device until a transmission from the hardware device is completed with one of a definite success and a definite failure, and force virtual memory to remain real when the buffer is pinned;
configure a memory manager to maintain a reference count of concurrent accessors;
access the data item in the buffer with a first accessor for a first transmission of the data item to a receiver through a network;
start a first timeout clock set to time-out after an interval that is less than a round-trip time required for receipt of an error condition from the network;
responsive to a signal indicating that the first timeout clock has timed-out, access the data item in the buffer with a second accessor for a second transmission of the data item to the receiver through the network, where the second accessor selects a path for the second transmission from among a plurality of transmission paths that avoids use of at least one network path element used by the first accessor during the first transmission;
start a second timeout clock set to time-out after the interval; and
control the memory manager to lock the buffer during write activity, to permit read access to the buffer by the first accessor and the second accessor and to return the buffer to a free buffer pool when the reference count reaches zero.

9. The computer program product of claim 8, where the computer readable program when executed on the computer causes the computer to:
configure the memory manager to maintain the reference count of concurrent accessors by maintaining a count of the accesses to the buffer by the first accessor and the second accessor by incrementing the reference counter on each of the accesses and decrementing the reference counter on a completion of the transmission by the first accessor and the second accessor.

10. The computer program product of claim 8, where the computer readable program when executed on the computer further causes the computer to determine a value for the interval by:
receiving network monitoring data;
determining a round-trip network response time; and
setting the value of the interval at least in accordance with the determined round-trip network response time.

11. The computer program product of claim 10, where setting the value of the interval further considers a quality-of-service parameter.

12. The computer program product of claim 8, where the second accessor selects the path for the second transmission further in accordance with at least one of a least transmission cost path and a highest performance path.

13. The computer program product of claim 8, where the second accessor selects the path for the second transmission further in accordance with a path offering best quality-of-service guarantees.

14. The computer program product of claim 8, where the second accessor selects the path for the second transmission further in accordance with an analysis of network performance monitoring statistics.

15. The computer program product of claim 8 embodied in a storage controller wherein the network comprises a storage network.

16. The computer program product of claim 8 embodied in a network appliance wherein the network comprises the Internet.

17. The computer program product of claim 8, in which the computer readable program when executed on a computer further causes the computer to:
 control a network monitoring data analyzer to analyze data for the computer; and
 control an interval tuner to tune the interval which the first timeout clock uses to time-out.

\* \* \* \* \*